United States Patent
Karunakaran et al.

(10) Patent No.: US 11,444,883 B2
(45) Date of Patent: Sep. 13, 2022

(54) SIGNATURE BASED MANAGEMENT OF PACKETS IN A SOFTWARE DEFINED NETWORKING ENVIRONMENT

(71) Applicant: VMware Inc., Palo Alto, CA (US)

(72) Inventors: Senthilkumar Karunakaran, Palo Alto, CA (US); Chidambareswaran Raman, Sunnyvale, CA (US); Neha Repal, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 212 days.

(21) Appl. No.: 16/746,043

(22) Filed: Jan. 17, 2020

(65) Prior Publication Data

US 2021/0226899 A1   Jul. 22, 2021

(51) Int. Cl.
| | |
|---|---|
| *H04L 47/32* | (2022.01) |
| *G06F 9/455* | (2018.01) |
| *H04L 41/0803* | (2022.01) |
| *H04L 47/33* | (2022.01) |
| *H04L 61/5007* | (2022.01) |
| *H04L 41/342* | (2022.01) |
| *H04L 49/00* | (2022.01) |
| *H04L 9/40* | (2022.01) |
| *H04L 61/103* | (2022.01) |
| *H04L 41/0816* | (2022.01) |

(52) U.S. Cl.
CPC .......... *H04L 47/32* (2013.01); *G06F 9/45558* (2013.01); *H04L 41/0803* (2013.01); *H04L 47/33* (2013.01); *H04L 61/5007* (2022.05); *G06F 2009/45587* (2013.01)

(58) Field of Classification Search
None
See application file for complete search history.

(56) References Cited

U.S. PATENT DOCUMENTS

| | | | | |
|---|---|---|---|---|
| 8,804,708 | B1 * | 8/2014 | White | H04L 45/745 370/360 |
| 2010/0131636 | A1 * | 5/2010 | Suri | H04L 45/00 709/224 |
| 2013/0070762 | A1 * | 3/2013 | Adams | H04L 49/70 370/389 |
| 2014/0195666 | A1 * | 7/2014 | Dumitriu | H04L 41/5038 709/223 |

(Continued)

*Primary Examiner* — Ajit Patel
*Assistant Examiner* — Liem H. Nguyen
(74) *Attorney, Agent, or Firm* — Patterson & Sheridan, LLP

(57) ABSTRACT

Certain embodiments described herein are generally directed to a method for managing packets at a virtual forwarding element of a hypervisor. In one example, the method includes receiving a first plurality of packets at a virtual port of the virtual forwarding element. The method further includes detecting the first plurality of packets correspond to a signature configured at the virtual port. The method also includes dropping at least one packet of the first plurality of packets at the virtual port based on detecting the first plurality corresponds to the signature. The method further includes receiving a second plurality of packets at the virtual port of the virtual forwarding element, wherein the second plurality of packets do not correspond to the signature. The method also includes forwarding the second plurality of packets to one or more destinations by the virtual forwarding element.

18 Claims, 3 Drawing Sheets

(56) References Cited

U.S. PATENT DOCUMENTS

| | | | |
|---|---|---|---|
| 2016/0110212 A1* | 4/2016 | Karnes | G06F 9/45558 |
| | | | 718/1 |
| 2016/0205048 A1* | 7/2016 | Zhu | H04L 45/38 |
| | | | 370/409 |
| 2018/0191642 A1* | 7/2018 | Biederman | H04L 49/9005 |
| 2019/0235909 A1* | 8/2019 | Jin | H04L 41/00 |
| 2019/0273683 A1* | 9/2019 | Jiang | H04L 61/2007 |
| 2020/0344166 A1* | 10/2020 | Roberts | H04L 45/748 |

* cited by examiner

SIGNATURE BASED MANAGEMENT OF PACKETS IN A SOFTWARE DEFINED NETWORKING ENVIRONMENT

BACKGROUND

Software defined networking (SDN) comprises a plurality of hosts in communication over a physical network infrastructure, each host having one or more virtual computing instances such as virtual machines (VMs) or containers that are connected to logical overlay networks that may span multiple hosts and are decoupled from the underlying physical network infrastructure. One common characteristic of software defined networking is a separation of the control plane from the data plane. The control plane is concerned with determining the logical overlay network topology and maintaining information about network entities such as logical switches, logical routers, and endpoints, etc. The logical topology information is translated by the control plane into network configuration data that is then communicated to network elements of each host. The network configuration data, for example, includes forwarding table entries to populate forwarding tables at virtual switche(s) provided by the hypervisor (i.e., virtualization software) deployed on each host. In some cases, the control plane may need to transmit the network configuration data, or other types of data, to one or more VMs running on the virtualization software of a host.

Generally, multiple virtual computing instances run "on top of" a hypervisor, where each virtual computing instance is connected through a virtual port to a virtual forwarding element (e.g., virtual switch, virtual router, etc.) provided by the hypervisor. In certain cases, the virtual forwarding element may receive an undesired (e.g., rogue) traffic or packet flow (e.g., a sequence of packets) from a virtual computing instance through the virtual port. In one example, an undesired traffic flow may be traffic configured to perpetrate a denial of service (DOS) attack at a victim host to disrupt services (e.g., dynamic host configuration protocol (DHCP) services) of the victim host. In response to detection of such undesired traffic, certain existing techniques limit an administrator to quarantining the virtual computing instance, such as by powering off the virtual computing instance, or by decoupling or disconnecting the virtual port from which the undesired network traffic is received. However, it is not effective or optimal to disrupt all operations of a virtual computing instance, which causes a disruption of the flow of other desired packets that the virtual computing instance is transmitting to the virtual forwarding element, only due to a certain undesired packet flow.

DETAILED DESCRIPTION

Embodiments presented herein provide techniques for configuring a hypervisor, such as a virtual forwarding element within the hypervisor, to block or drop undesired packets, such as by refraining to forward the undesired packets, sent from a virtual computing instance while receiving and processing, such as by forwarding to their destination, other packets, e.g., desired packets, based on comparing packets to signatures. A signature may be any detectable attribute of one or more packets arriving at a virtual port or the occurrence of any one or more events at a virtual port of the virtual forwarding element that connect the virtual computing instance to the virtual forwarding element. For example, in certain embodiments, a virtual forwarding element is configured to monitor packets on one or more of its virtual ports and determine for each virtual port if one or more packets received on the virtual port match or correspond to one or more signatures. In certain embodiments, if one or more packets received on a virtual port match a particular signature, the hypervisor is configured to cause a notification to be sent to a management plane (e.g., for handling by an administrator), the notification indicating, for example, which signature (e.g., using a signature ID) the one or more packets match and/or for which port (e.g., using a port ID). In certain embodiments, based on receiving the notification, the management plane (e.g., via input from an administrator) determines how to handle packets that match the signature at the virtual port and configures the virtual forwarding element accordingly. For example, the management plane may configure the virtual forwarding element to blacklist or whitelist the signature at the virtual port. By blacklisting the signature at the virtual port, the management plane effectively configures the virtual forwarding element to drop any subsequent packet(s) received from the virtual port that correspond to the signature, while allowing other subsequent packets received from the virtual port that do not correspond to the signature to be forwarded to their destination. A subsequent packet refers to a packet that is received at a virtual port at a time after the blacklisting or whitelisting takes effect.

Figure 1:
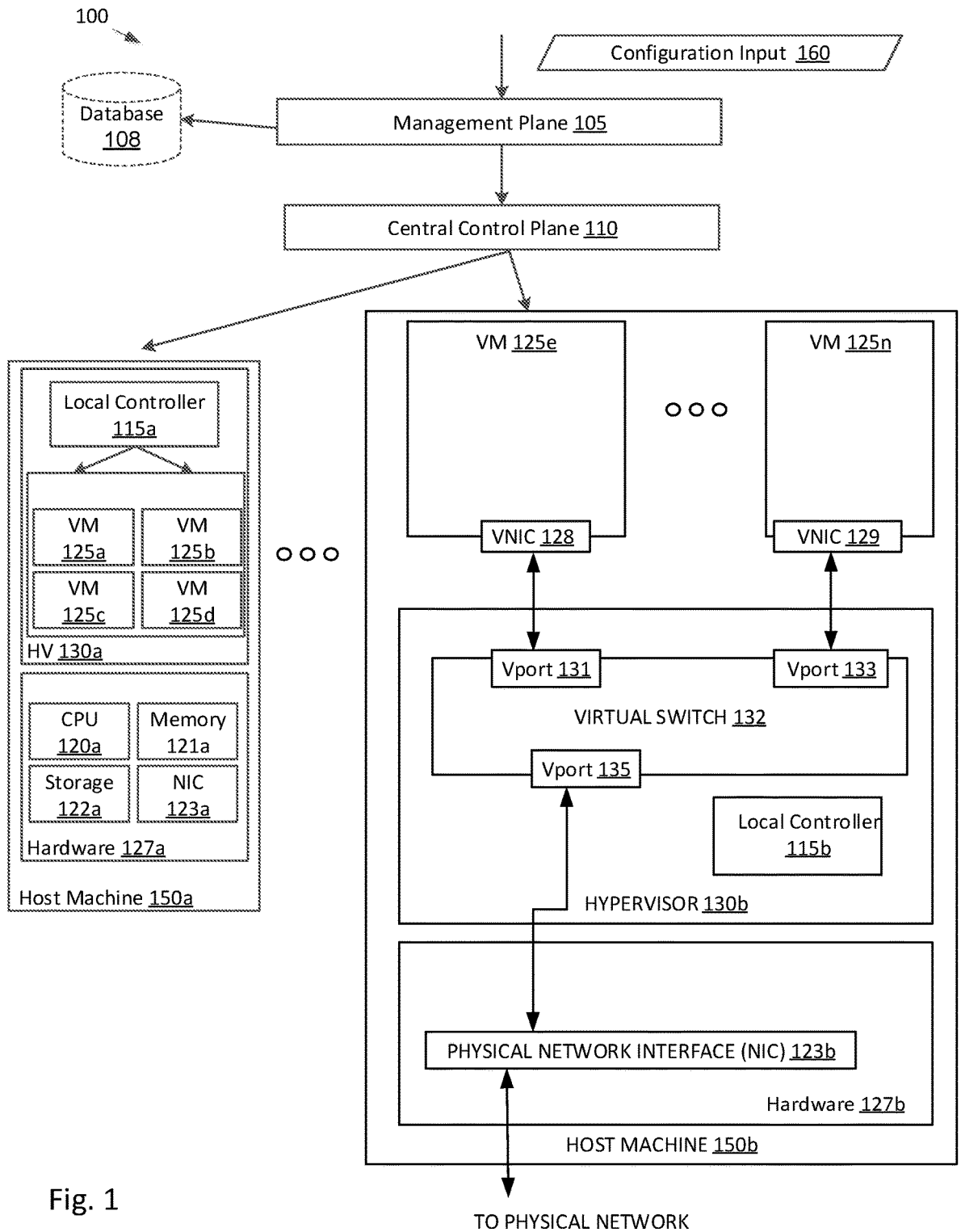
FIG. 1 is a block diagram of a network control system for a virtual network, according to some embodiments.

FIG. 1 is a block diagram of a network control system 100 for implementing software defined networking (SDN) in the embodiments described herein. As shown, network control system 100 includes a central control plane 110, a management plane 105, and multiple local controllers (also called the local control plane (LCP)) 115a-115b that operate on host machines 150a-150b. Host machines 150a-150b are physical computing devices that support the execution of virtual machines (VMs). In addition, each of host machines 150a-150b runs a hypervisor 130a-130b, respectively, capable of creating and managing a plurality of virtual machines on host machines 150a-150b. For example, hypervisor 130a manages VMs 125a-125d while hypervisor 130b manages VMs 125e through 125n. Each of virtual machines 125a-125n are examples of endpoints. Though certain embodiments are described herein with respect to VMs, the same principals and techniques may also apply to other appropriate endpoints or virtual computing instances (e.g., container, data compute node, isolated user space instance). Also, although host 150a and 150b include similar components, note that the components of host machine 150a are shown in a more compact and less detailed manner while the components of host machine 150b are illustrated in greater detail.

Hypervisors 130a-130b and virtual machines 125a-125n may be stored in a memory (e.g., memory 121a) of host machines 150a-150b. Hypervisors 130a-130b abstract processor (e.g., CPU 120a), memory (e.g., memory 121a), storage (e.g., storage 122a), and/or networking (e.g., networking interface card (NIC) 123a) resources of host machines 150a-150b into multiple virtual machines (e.g., VMs 125a-125n) that can run side-by-side on the same host machines 150*a*-150*b*. That is, the virtualization software partitions physical host machines 150*a*-150*b* into multiple secure and portable virtual machines. Each virtual machine may represent a complete virtual system—with virtual processors, virtual memory, virtual networking interface, virtual disk storage, and its own BIOS. For example, each virtual machine comprises a software-based virtual network adaptor, also referred to as a virtual network interface card (VNIC). VNICs 128 and 129 of VM 125*e* and 125*n*, respectively, are shown in FIG. 1. As described above, the components of host machine 150*a* are shown in less detail and, therefore, the VNICs of VMs 125*a*-125*d* are not shown. Each VNIC is logically connected to instantiations of the control plane (e.g., local controllers) running on host machines 150*a*-150*b* and provides network access for the virtual machine. For example, each of VNICs 128 and 129 is connected to local controller 115*b* through virtual switch 132 that may serve as a physical network switch, i.e., serve as an edge device on the physical network, but implemented in software. As described below, virtual switch 132 is implemented by the underlying hypervisor 130*b* and is configured with internally-maintained forwarding tables that are populated by central control plane 110 for determining how to process and forward ingress packets. Using the internally-maintained forwarding tables, virtual switch 132 is responsible for processing and forwarding packets being exchanged between VNICs of VMs 125*e*-125*n* and the local controller 115*b*.

As shown, virtual switch 132 has a number of virtual ports, each of which may be responsible for forwarding packets to or receiving packets from a different VM. For example, each virtual port is connected to a respective VM's VNIC and is configured to forward traffic that is destined for the VM, to the VM's VNIC, or receive traffic generated by the VM from the VM's VNIC. In the example of FIG. 1, virtual port 131 is configured to exchange packets between VNIC 128 and virtual switch 132 while virtual port 133 is configured to exchange packets between VNIC 129 and virtual switch 132. A VM, such as VM 125*e* may execute various applications, processes, etc., that may generate data packets destined for one or more of the other VMs managed by hypervisor 130*b* or an entity outside host machine 150*b*, in a physical network. Through VNIC 128 and then virtual port 131, data packets are received at virtual switch 132 and then forwarded accordingly. As shown, virtual switch 132 also has a virtual port 135 that is responsible for exchanging packets between virtual switch 132 and physical NIC 123*b*, which connects host machine 150*b* to the physical network.

The hypervisor architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, the virtual switch, along with hardware drivers, may reside in the privileged virtual machine.

Though shown as single entities, it should be understood that both management plane 105 and central control plane 110 may be implemented as a distributed or clustered systems. For example, management plane 105 may include multiple computing devices that implement management plane functions, and a central control plane 110 may include multiple central (or distributed) controller computers, virtual machines, containers, or processes that implement central control plane functions. In some embodiments, one or more centralized controllers include both management plane and central control plane functions (e.g., as separate applications or functions).

In some embodiments, management plane 105 is responsible for receiving logical network configuration inputs 160. Users (e.g., network administrators) may input logical network configuration data through a user interface such as a command-line interface or graphical user interface. Each logical network configuration for each logical network, in some embodiments, may include data defining one or more endpoints (e.g., virtual machines 125*a*-125*n*) and the connections between the endpoints.

Management plane 105 further generates desired state data that specifies how the logical network should be implemented in the physical infrastructure based on logical network configuration input 160. In some embodiments, this data includes description of the logical forwarding elements (e.g., logical switches, logical routers, etc.) and logical ports in a uniform format (e.g., as a set of database records or another format). The central control plane 110 then updates/implements the logical network based on the desired state information. For example, the central control plane 110 is responsible for managing and maintaining information about virtual machines, virtual switches, virtual routers, virtual ports, etc. implemented on host machines. In certain embodiments, central control plane 110 is responsible for configuring physical network elements implemented by host machines 150, 155, including virtual switches, packet filters (not shown), and tunnel endpoints (not shown) to ensure that the defined logical network topologies and policies are properly implemented.

As discussed, in certain cases, a virtual forwarding element may receive one or more undesired packets from a virtual computing instance through a virtual port that connects the virtual computing instance to the virtual forwarding element. As an example, virtual switch 132 may receive a rogue packet flow from VM 125*e* through virtual port 131. In response, certain techniques may configure virtual switch 132 to send a notification to management plane 105 to indicate that a rogue packet flow is being or has been received from VM 125*e*. In some such cases, management plane 105 may be configured to display this notification, for viewing by an administrator, on a user interface that provides access to management plane 105. The administrator, however, may be limited to quarantining VM 125*e*, such as by powering off VM 125*e*, or by decoupling virtual port 131. But, disrupting all operations of VM 125*e*, including the transmission and reception of other packets, only because one packet flow is undesired, is not optimal. In one example, the rogue packet flow may correspond to a DOS attack but other examples of undesired packet(s) are within the scope of this disclosure.

Accordingly, certain embodiments described herein allow for configuring a hypervisor (e.g., a virtual forwarding element of the hypervisor) to block or drop undesired packets sent from a VM while processing other packets of the VM, e.g., desired packets, using signatures. For example, in certain embodiments, a virtual switch, such as virtual switch 132, is configured with a signature in relation to virtual port 131, such that upon detecting one or more packets that correspond to the signature arriving at virtual port 131, virtual switch 132 is configured to, for example, drop at least one of the one or more packets or one or more subsequently received packets ("subsequent packets") corresponding to the signature, while processing other packets arriving at virtual port 131 that do not correspond to the signature. A packet that corresponds to a signature herein refers to a packet that meet the signature's requirements.

As described, a signature may be any detectable attribute of one or more packets arriving at a virtual port or the occurrence of any one or more events at the virtual port. For example, a signature may include certain information included in one or more packets arriving at a virtual port, a pattern associated with one or more packets arriving at the virtual port, the number or frequency of packets arriving at the virtual port, the time at which one or more packets arrive at the virtual port, the number of address resolution protocols taking place at the virtual port, or any combination thereof. Signatures may be port-specific or be applied to all virtual ports. For example, virtual switch 132 may be configured to determine whether one or more packets correspond to a signature a certain virtual port(s), or any virtual port. Also, multiple signatures may be defined for a single virtual port.

An administrator may define signatures, for a logical forwarding element and/or one or more logical port(s) or port group(s) of the logical forwarding element, by interfacing with management plane 105. The input the administrator provides for defining such signatures may be part of the logical network configuration input 160. Based on the administrators' input, management plane 105 then generates desired state data that includes instructions on how the signatures should be implemented with respect to the underlying virtual forwarding element(s) and/or virtual port(s) or port group(s) that correspond to the logical forwarding element and/or logical port(s) or port group(s). Central control plane 110 then configures the virtual forwarding element(s) and/or virtual port(s) or port group(s) through corresponding local controllers.

As an example, in certain embodiments, virtual switch 132 may be configured to detect whether packets arriving at, for example, virtual port 131 correspond to a signature and to notify management plane 105 (e.g., an administrator accessing management plane 105) upon detecting that the one or more packets correspond to or match the signature. Because, in some cases, packets that correspond to a signature may not necessarily be undesired, it may be advantageous in such cases to notify management plane 105 when a signature is detected and enable management plane 105 to make a determination as to whether any subsequent corresponding packets should be in fact dropped or processed. Therefore, in such cases, virtual switch 132 causes a notification to be sent to management plane 105 that indicates the signature has been detected.

Upon receiving the notification, management plane 105 is able to decide how to treat any subsequent packets received at virtual port 131 that correspond to the signature. For example, management plane 105 may blacklist the signature at virtual port 131, which may indicate to virtual switch 132 to drop subsequent packets that correspond to the signature. In another example, management plane 105 may decide to whitelist the signature at virtual port 131, which may indicate to virtual switch 132 to continue to process any subsequent packets that correspond to the signature. In one example, allowing an administrator to whitelist a signature is advantageous when the VM is an infrastructure VM, such as an edge serviced gateway (ESG) VM. For example, an ESG VM provides VMs and other components in a data center with connectivity to destinations external to the data center and therefore may normally communicate packets that would otherwise be considered abnormal and therefore potentially undesired for other types of VMs.

In certain embodiments, management plane 105 provides representational state transfer (REST) application programming interfaces (APIs) for an administrator for the purpose of blacklisting and whitelisting signatures. The REST APIs may also be used by third party services (e.g., a partner service VM), that have integrated with an SDN data center, to automatically whitelist a certain signature on certain virtual port(s). Blacklisting and whitelisting signatures may be port-specific. This means that, for example, a certain signature may be blacklisted at virtual port 131 and whitelisted at virtual port 133. However, in other examples, signatures may be universally blacklisted or whitelisted on all virtual ports on a virtual switch.

Note that, as discussed, in one example, a signature may be a detectable attribute associated with a single packet or a single occurrence of an event. As an example, a signature may refer to certain information being included in a packet. In such a case, virtual switch 132 may receive a packet at virtual port 131 including the information, determine that the signature is present, notify management plane 105, and then be configured by management plane 105 to block packets that satisfy that signature. In such a case, the next time a packet that satisfies the signature arrives at virtual port 131, virtual switch 132 drops the packet.

In another example, the signature may be a detectable attribute associated with a series of packets or refer to a series of occurrences. As an example, a signature may refer to a certain number of packets with a certain destination IP address being received at a virtual port in a certain time period. A more specific example is a signature corresponding to at least five packets with the same destination IP address received in a period of 1 second, etc. In such a case, virtual switch 132 may receive, for example, a fifth packet with the same destination IP address in a period of 1 second, determine that the 5 packets correspond to the signature, notify management plane 105, and receive an indication from management plane 105 to block packets that meet that signature. In such a case, the next time virtual switch 132 receives five packets with that same destination IP address in a period of 1 second, virtual switch 132 drops the last packet. In certain embodiments, only the fifth packet is dropped because the earliest virtual switch 132 may be able to determine that such a signature is met is by waiting until the fifth packet is received. Thus, as soon as virtual switch 132 determines that the signature is met, which may be while virtual switch 132 is still examining the fifth packet, virtual switch 132 drops any packets associated with that signature, which is the fifth packet (e.g., because other packets have already been received and processed). In certain embodiments, virtual switch 132 is also configured to drop any additional packets in that packet flow.

Another example of a signature that can be defined in relation to multiple packets is a signature for detecting a passive mode file transfer protocol (FTP) attack. FTP is a commonly used protocol for exchanging files over any network that supports the transport control protocol (TCP)/IP protocol (such as the Internet or an intranet). As one of ordinary skill in the art appreciates, in an active mode FTP, a client (e.g., an entity outside of host machine 150*b* that acts as a client in a client-server model) connects to a FTP server (e.g., VM 125*e*) on a port (e.g., sub-port X of Vport 131) and requests a connection for exchanging files with the FTP server. Next, the FTP server performs security checks on the client and, if the security checks are successful, the client waits for a connection from the FTP server on a different port (e.g., sub-port X+1 of Vport 131). Once the FTP server and the client establish a connection on this port, file transfer can begin.

Unlike the active mode FTP, in a passive mode FTP, after the FTP server performs the security checks, the client issues a PASV (passive) command to the FTP server. In response to this PASV command, the FTP server responds by sending a PORT command back to the client that includes a random port number of a port (e.g., another sub-port of Vport 131) and a corresponding IP address. The FTP server then starts listening on this port. As such, instead of waiting for a connection from the FTP server, such as in the active FTP mode, in the passive FTP mode the client initiates a connection to the FTP server using the port associated with the random port number. Once the FTP server and the client establish a connection on this port, file transfer can begin. As one of ordinary skill in the art appreciates, there is, however, a security risk associated with the passive mode FTP. The security risk is that any malicious actor on the Internet can connect to the port associated with the random port number without proper access privileges and steal data that is intended for the client. After connecting to the port, the malicious actor can read or write data to and from the FTP server. This security risk is inherent in FTP, but it is even higher with Internet Information Services (IIS) on a Windows 2000-based server. As one of ordinary skill in the art appreciates, the higher security risk associated with IIS in such cases is because Windows 2000 returns port numbers in an incremental order.

Accordingly, in the example of FIG. 1, virtual switch 132 may be configured with a signature by management plane 105 to detect passive mode FTP attacks. An example of how virtual switch 132 may detect a passive mode FTP attack is that virtual switch 132 may intercept a first packet, which is generated by VM 125e (the FTP server) and includes a PORT command, to a client that has previously requested the passive mode FTP. The PORT command includes a random port number of a port (e.g., sub-port of Vport 131). By intercepting this first packet, virtual switch 132 learns the client's IP address as well as the port number, both of which virtual switch 132 caches. As described above, a malicious actor at this point in time can connect to this port and request a data transfer. Accordingly, a second packet may be received at that port from a malicious actor. Subsequently, virtual switch 132 may detect a third packet that includes the FTP server's response to the malicious actor. By intercepting this third packet, virtual switch 132 is able identify the IP address of the malicious actor. By comparing the IP address of the malicious actor and the cached IP address of the client and determining that they do not match, virtual switch 132 is then able to determine that a signature relating to a passive mode FTP has been detected. In this example, the signature is, therefore, detected based on examining the first packet and the third packet, which may be referred to as a plurality of packets.

Once the signature is detected, in the event the signature is already blacklisted, virtual switch 132 may automatically drop any additional packets containing data that are sent to the malicious actor by the FTP server. Alternatively, if the signature is not already blacklisted, virtual switch 132 may then generate a notification to management plane 105, the notification being indicative of the signature being detected. An administrator interfacing with management plane 105 may then blacklist the signature, causing virtual switch 132 to drop any additional packets being sent to the malicious actor by the FTP server.

Figure 1A:
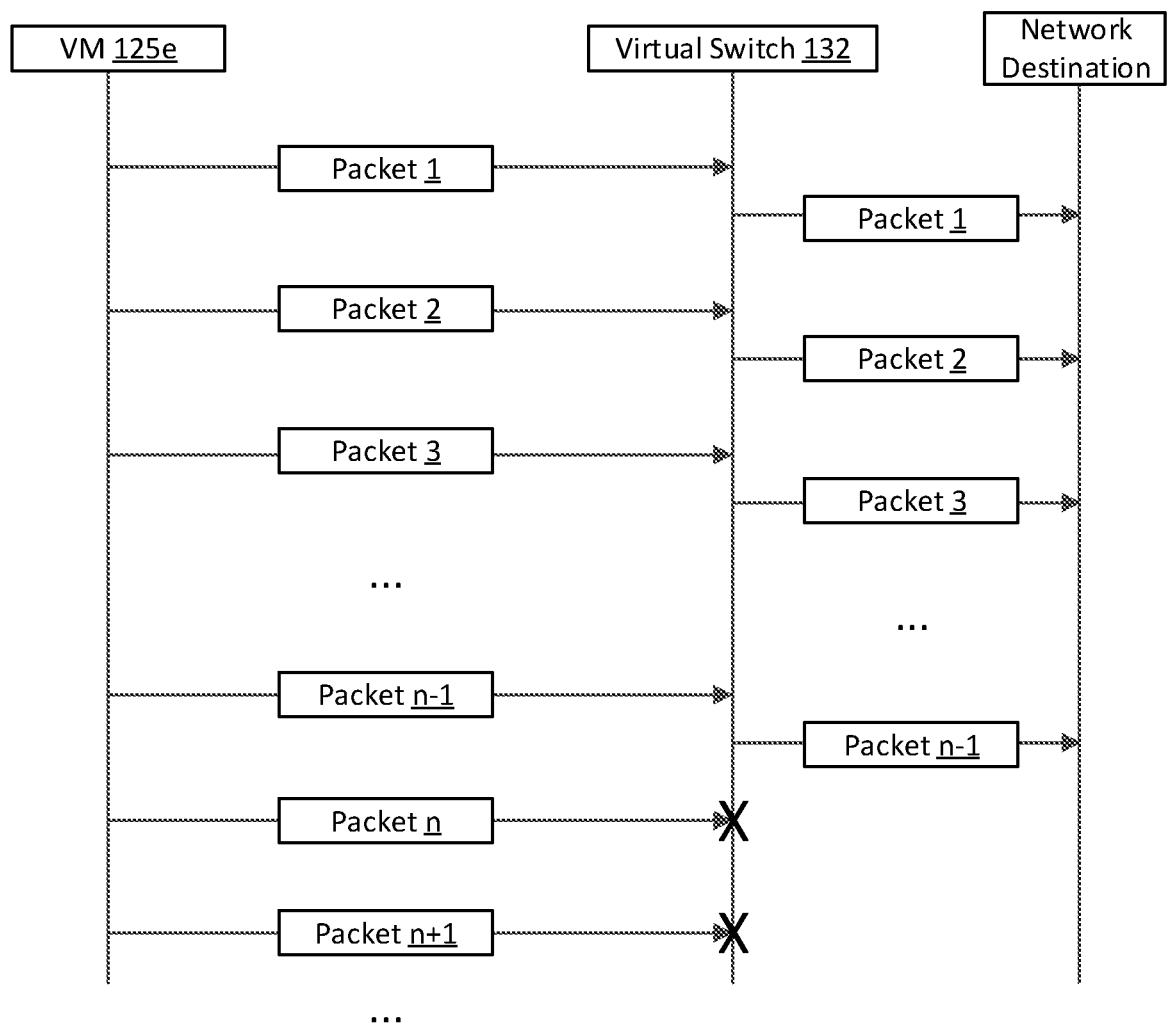
FIG. 1A illustrates an example of a series of packets being transmitted by a VM to a virtual switch, according to some embodiments.

FIG. 1A illustrates an example of a series or set of packets being transmitted by VM 125e to virtual switch 132. In this example, the signature may correspond to at least n packets having certain attribute(s) being received at virtual switch 132 from virtual port 131 within a period of 1 second. In one example, the signature may be designed to match on a set of packets corresponding to a DHCP flood or a denial-of-service attack. As shown, virtual switch 132 receives packet 1 and forwards it to a network destination, which may be one of VMs 125 or a network destination in the physical network. Virtual switch 132 then similarly receives and forwards packets 2 through (n-1). When virtual switch 132 receives packet n, virtual switch 132 determines that the signature described above is satisfied and, therefore, drops packet n and any packets received after packet n with the same certain attributes. For example, FIG. 1A shows virtual switch 132 dropping packets n and (n+1) and so on. In another embodiment, only the nth packet is dropped. In such embodiments, after packet n is dropped, virtual switch 132 restarts the counter such that packet (n+1) would be counted as packet 1 in the series again. For example, if n=10 and virtual switch 132 receives 50 consecutive packets with the same attribute(s), then packets 10, 20, 30, 40, and 50 are dropped.

Other examples of signatures that are associated with a series of packets or a series of occurrences include a signature that is defined based on a certain number of MAC addresses associated with a virtual port for which forging is allowed. In such an example, the management plane may drop or allow future MAC leanings on the virtual port. In another example, a signature may be defined based on a threshold for the number of address resolution protocol (ARP) events that may take place with respect to a virtual port on a virtual router. In such an example, once the signature is detected, the virtual router may send a notification to the management plane with the signature ID, which indicates to the management plane that the number of ARP events on the virtual port has exceeded the threshold. In response, the management plane may dynamically alter an ARP table of the virtual router, which may include limiting or expanding the number of ARP events allowed, etc. Accordingly, in certain aspects, a virtual forwarding element, based on detecting a signature, is configured in other manners than just to whitelist or blacklist one or more packets matching the signature.

In certain embodiments, virtual switch 132 may be configured to determine whether to drop or process packets received at virtual port 131 corresponding to a signature, without having to notify management plane 105 and receive configuration from management plane 105 on how to handle packets corresponding to the signature. For example, in one case, virtual switch 132 may have previously sent a notification to management plane 105 and, in response, was configured by management plane 105 to drop or process packets corresponding to the signature. In another example, signatures may be backlisted or whitelisted when they are initially defined by management plane 105. In such embodiments, an administrator may, for example, define a signature for a number of logical ports and automatically blacklist that signature at one of the number of logical ports. In such an example, upon detecting that one or more packets received at one or more virtual ports implementing the one or more logical ports correspond to the signature, at least one of the one or more packets may be dropped.

Figure 2:
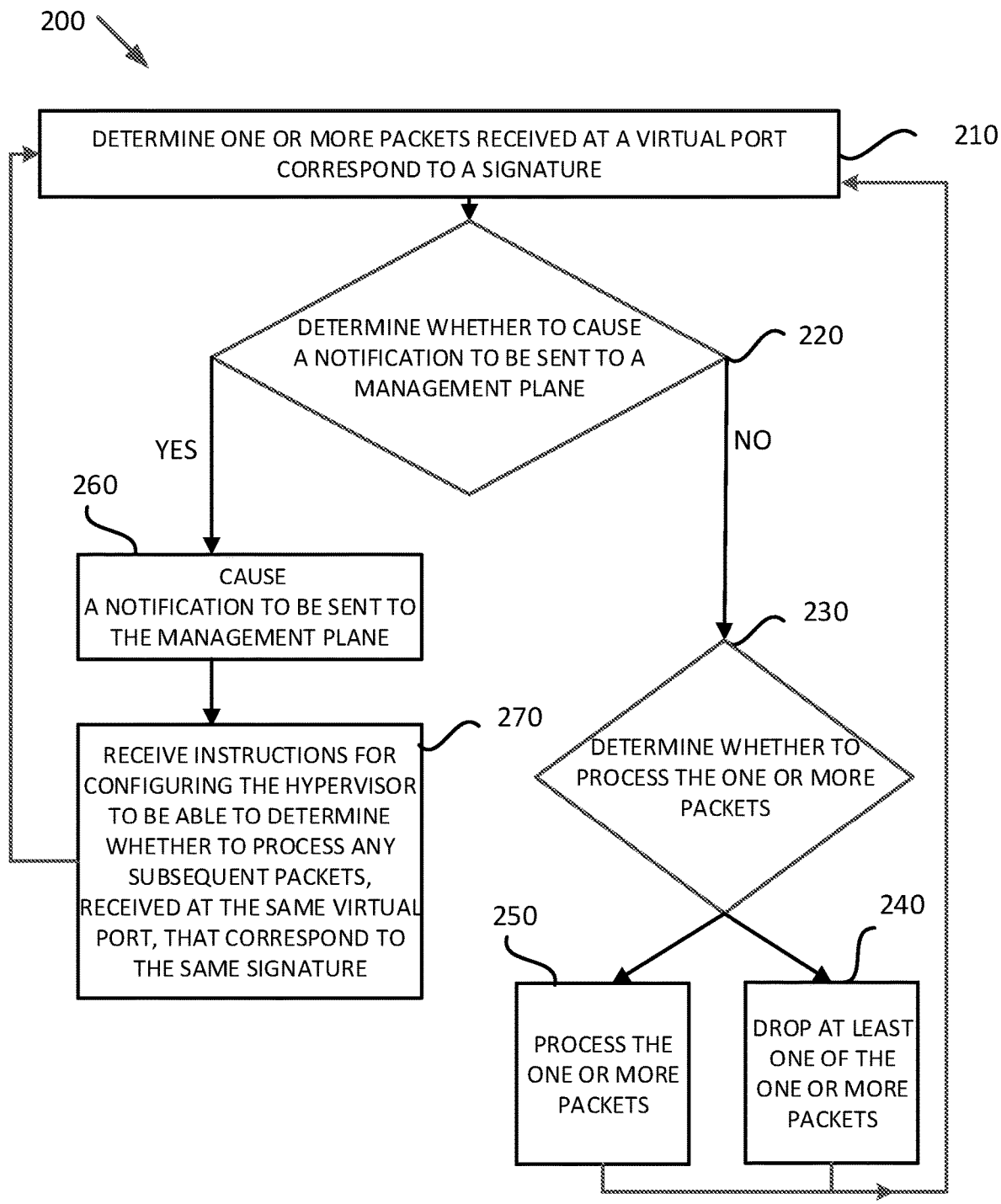
FIG. 2 is a flow diagram of example operations performed by a hypervisor, according to some embodiments.

FIG. 2 illustrates example operations 200 performed by a hypervisor, e.g., a virtual forwarding element provided by the hypervisor, for managing packets received at virtual ports from different VMs. Operations 200 are described herein with reference to FIG. 1 and its components.

At step 210, the hypervisor determines one or more packets received at a virtual port correspond to a signature. For example, virtual switch 132 of hypervisor 130b upon receiving one or more packets from VM 125e at virtual port 131, determines the one or more packets correspond to the signature.

At step 220, the hypervisor determines whether to cause a notification to be sent to management plane 105 based on the detection. For example, upon detecting one or more packets correspond to the signature at virtual port 131, virtual switch 132 may determine whether it is configured to cause a notification to be sent to management plane 105, such as to notify an administrator through a user interface of management plane 105. If virtual switch 132 is already configured with instructions to either process or drop the one or more packets, then virtual switch 132 may not cause a notification to be transmitted to management plane 105. In such a case, operations 200 move to step 230 where virtual switch 132 determines whether or not to process the one or more packets based on a set of instructions. For example, the set of instructions may indicate that the signature is blacklisted on virtual port 131, which means that, at step 240, virtual switch 132 should block at least one of the one or more packets. Alternatively, the set of instructions may indicate that the signature is whitelisted on virtual port 131, which means that, at step 250, virtual switch 132 should process the one or more packets.

If virtual switch 132 is configured to cause a notification to be sent to management plane 105, then at step 260, virtual switch 132 performs that action. For example, virtual switch 132 may send the notification to local controller 115b, which transmits the notification to central control plane 110 and central control plane 110 then sends the notification to management plane 105. Management plane 105 may display that notification to the administrator on a user interface. The notification may at least include information, such as a signature ID or name, that is indicative of the signature, a port ID on which the one or more packets were received, etc. Having received the notification, the administrator may perform one or more actions, which may include inputting configuration information in the user interface of management plane 105 for blacklisting or whitelisting the signature.

At step 270, the hypervisor receives instructions for configuring the hypervisor to be able to determine whether to process any subsequent packets, received at the same virtual port, that correspond to the same signature. For example, central control plane 110 sends instructions to local controller 115b, which is part of hypervisor 130b, to configure virtual switch 132 to be able to determine whether to process any subsequent packets, received at virtual port 131, that correspond to the same signature. At a later time, hypervisor 130b may receive a subsequent set of one or more packets that correspond to the signature at virtual port 131 of virtual switch 132, in which case, hypervisor 130b loops back to step 210. Once detecting the same signature at step 210, the operations move to step 220, at which point hypervisor 130b determines that it is already configured to determine whether or not to process the subsequent one or more packets without having to cause a notification to be sent to management plane 105. As such, hypervisor 130b then moves to step 230 and determines whether to process the subsequent one or more packets. Subsequently, one of steps 240 and 250 is performed as described above.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for managing packets at a virtual forwarding element of a hypervisor, the virtual forwarding element being one of a virtual switch or a virtual router, the method comprising:
receiving a first plurality of packets from a first virtual machine at a first virtual port of the virtual forwarding element, the first virtual machine and virtual forwarding element running on a host machine;
detetecting that the first plurality of packets correspond to a signature, wherein the virtual forwarding element is assaociated with a port-specific configuration to drop packets recieved at the first virtual port that correspond to the signature;
dropping at least one packet of the first plurality of packets at the first virtual port based on the detecting that the first plurality of packets correspond to the signature;
receiving a second plurality of packets at the first virtual port of the virtual forwarding element, wherein the second plurality of packets do not correspond to the signature;
forwarding the second plurality of packets to one or more first destinations by the virtual forwarding element;
receiving a third plurality of packets from a second virtual machine at a second virtual port of the virtual forwarding element, the second virtual machine running on the host machine, wherein the third plurality of packets correspond to the signature; and
forwarding the third plurality of packets to one or more second destinations by the virtual forwarding element.

2. The method of claim 1, further comprising:
receiving a fourth plurality of packets at the first virtual port;
detecting the fourth plurality of packets correspond to the signature;
causing a notification to be transmitted to a management plane, the notification including information indicative of the signature; and
receiving instructions from the management plane, wherein:
the instructions configure the virtual forwarding element to drop at least one packet of a subsequent plurality of packets received at the first virtual port that satisfy the signature; and
the subsequent plurality of packets include the first plurality of packets.

3. The method of claim 1, further comprising:
receiving a fourth plurality of packets at the second virtual port;
detecting the fourth plurality of packets correspond to the signature;
causing a notification to be transmitted to a management plane, the notification including information indicative of the signature; and
receiving instructions from the management plane, wherein:
the instructions configure the virtual forwarding element to forward a subsequent plurality of packets received at the second virtual port that satisfy the signature; and
the subsequent plurality of packets include the third plurality of packets.

4. The method of claim 1, wherein the signature is based on one or more characteristics of the first plurality of packets, the one or more characteristics comprising one or more of: an Internet Protocol (IP) address associated with the first plurality of packets, a number of packets in the first plurality of packets received during a defined time frame, and a time period in which the first plurality of packets are received.

5. The method of claim 1, wherein multiple different signatures are configured at the first virtual port including the signature.

6. The method of claim 1, wherein the at least one packet of the first plurality of packets is a last packet of the first plurality of packets received at the first virtual port.

7. A computer system, comprising:
a memory comprising executable instructions; and
a processor in data communication with the memory and configured to execute the instructions to cause the computer system to perform a method of managing packets at a virtual forwarding element of a hypervisor of the computer system, the virtual forwarding element being one of a virtual switch or a virtual router, the method comprising:
- receiving a first plurality of packets from a first virtual machine at a first virtual port of the virtual forwarding element, the first virtual machine and virtual forwarding element running on a host machine;
- detecting that the first plurality of packets correspond to a signature, wherein the virtual forwarding element is associated with a port-specific configuration to drop packets recieved at the first virtual port that correspond to the signature;
- dropping at least one packet of the first plurality of packets at the fisrt virtual port based on the detecting that the first plurality of packets correspond to the signature;
- receiving a second plurality of packets at the first virtual port of the virtual forwarding element, wherein the second plurality of packets do not correspond to the signature;
- forwarding the second plurality of packets to one or more first destinations by the virtual forwarding element;
- receiving a third plurality of packets from a second virtual machine at a second virtual port of the virtual forwarding element, the second virtual machine running on the host machine, wherein the third plurality of packets correspond to the signature; and
- forwarding the third plurality of packets to one or more second destinations by the virtual forwarding element.

8. The computer system of claim 7, wherein the method further comprises:
- receiving a fourth plurality of packets at the first virtual port;
- detecting the fourth plurality of packets correspond to the signature;
- causing a notification to be transmitted to a management plane, the notification including information indicative of the signature; and
- receiving instructions from the management plane, wherein:
  - the instructions configure the virtual forwarding element to drop at least one packet of a subsequent plurality of packets received at the first virtual port that satisfy the signature; and
  - the subsequent plurality of packets include the first plurality of packets.

9. The computer system of claim 7, wherein the method further comprises:
- receiving a fourth plurality of packets at the second virtual port;
- detecting the fourth plurality of packets correspond to the signature;
- causing a notification to be transmitted to a management plane, the notification including information indicative of the signature; and
- receiving instructions from the management plane, wherein:
  - the instructions configure the virtual forwarding element to forward a subsequent plurality of packets received at the second virtual port that satisfy the signature; and
  - the subsequent plurality of packets include the third plurality of packets.

10. The computer system of claim 7, wherein the signature is based on one or more characteristics of the first plurality of packets, the one or more characteristics comprising one or more of: an Internet Protocol (IP) address associated with the first plurality of packets, a number of packets in the first plurality of packets received during a defined time frame, and a time period in which the first plurality of packets are received.

11. The computer system of claim 7, wherein multiple different signatures are configured at the first virtual port including the signature.

12. The computer system of claim 7, wherein the at least one packet of the first plurality of packets is a last packet of the first plurality of packets received at the first virtual port.

13. A non-transitory computer readable medium having instructions stored thereon that, when executed by a computer system, cause the computer system to perform a method comprising:
- receiving a first plurality of packets from a first virtual machine at a first virtual port of a virtual forwarding element of a hypervisor of the computer system, the virtual forwarding element being one of a virtual switch or a virtual router, the first virtual machine and the virtual forwarding element running on a host machine;
- detecting that the first plurality of packets correspond to a signature, wherein the virtual forwarding element is associated with a port-specific configuration to drop packets recieved at the first virtual port that correspond to the signature;
- dropping at least one packet of the first plurality of packets at the first virtual port based on the detecting that the first plurality of packets correspond to the signature;
- receiving a second plurality of packets at the first virtual port of the virtual forwarding element, wherein the second plurality of packets do not correspond to the signature;
- forwarding the second plurality of packets to one or more first destinations by the virtual forwarding element;
- receiving a third plurality of packets from a second virtual machine at a second virtual port of the virtual forwarding element, the second virtual machine running on the host machine, wherein the third plurality of packets correspond to the signature; and
- forwarding the third plurality of packets to one or more second destinations by the virtual forwarding element.

14. The non-transitory computer readable medium of claim 13, wherein the method further comprises:
- receiving a fourth plurality of packets at the first virtual port;
- detecting the fourth plurality of packets correspond to the signature;
- causing a notification to be transmitted to a management plane, the notification including information indicative of the signature; and
- receiving instructions from the management plane, wherein:
  - the instructions configure the virtual forwarding element to drop at least one packet of a subsequent plurality of packets received at the first virtual port that satisfy the signature; and
  - the subsequent plurality of packets include the first plurality of packets.

15. The non-transitory computer readable medium of claim 13, wherein the method further comprises:
- receiving a fourth plurality of packets at the second virtual port;

detecting the fourth plurality of packets correspond to the signature;

causing a notification to be transmitted to a management plane, the notification including information indicative of the signature; and receiving instructions from the management plane, wherein:
- the instructions configure the virtual forwarding element to forward a subsequent plurality of packets received at the second virtual port that satisfy the signature; and
- the subsequent plurality of packets include the third plurality of packets.

16. The non-transitory computer readable medium of claim 13, wherein the signature is based on one or more characteristics of the first plurality of packets, the one or more characteristics comprising one or more of: an Internet Protocol (IP) address associated with the first plurality of packets, a number of packets in the first plurality of packets received during a defined time frame, and a time period in which the first plurality of packets are received.

17. The non-transitory computer readable medium of claim 13, wherein multiple different signatures are configured at the first virtual port including the signature.

18. The non-transitory computer readable medium of claim 13, wherein the at least one packet of the first plurality of packets is a last packet of the first plurality of packets received at the first virtual port.

* * * * *